(12) United States Patent
Chiang

(10) Patent No.: US 6,764,246 B1
(45) Date of Patent: Jul. 20, 2004

(54) COMBINATION OF HANDLEBAR STEM AND TWO CONNECTION PARTS ON TWO ENDS OF THE HANDLEBAR STEM

(76) Inventor: Cheng-Hsun Chiang, No 487, Guojung Rd., Dali City, Taichung (TW)

( * ) Notice: Subject to any disclaimer, the term of this patent is extended or adjusted under 35 U.S.C. 154(b) by 0 days.

(21) Appl. No.: 10/392,170

(22) Filed: Mar. 20, 2003

(51) Int. Cl.[7] .................................................. B62K 21/12
(52) U.S. Cl. ........................ 403/290; 403/24; 403/345; 403/300; 74/551.1
(58) Field of Search ................................ 403/290, 289, 403/24, 345, 300, 301, 302; 74/551.1, 551.2, 551.3, 551.4

(56) References Cited

U.S. PATENT DOCUMENTS 5,319,993 A * 6/1994 Chiang ...................... 74/551.1
5,387,255 A * 2/1995 Chiang ...................... 74/551.1
5,562,359 A * 10/1996 Marui ......................... 403/378

* cited by examiner

Primary Examiner—John R. Cottingham
(74) Attorney, Agent, or Firm—Rosenberg, Klein & Lee

(57) ABSTRACT

A bicycle handlebar stem assembly includes a stem with two lugs extending from one of two ends of the stem. A first connection member has an aperture through which the stem extends, and two recesses are defined in an inside of the first connection member so as to receive the two lugs therein. A second connection member has a clamp part on one end thereof and an insertion extends from the other end of the second connection member. The insertion is inserted in the other end of the stem.

4 Claims, 6 Drawing Sheets

COMBINATION OF HANDLEBAR STEM AND TWO CONNECTION PARTS ON TWO ENDS OF THE HANDLEBAR STEM

FIELD OF THE INVENTION

The present invention relates to a bicycle handlebar stem which has two lugs which are engaged with recesses in a first connection member by adhesive and the other connection member is glued to the other end of the handlebar stem.

BACKGROUND OF THE INVENTION

A conventional bicycle handlebar stem generally includes a tubular stem and a first connection member fixed to one end of the stem and a second connection member fixed to the other end of the stem. The first connection member is connected to the handlebar and the second connection member is connected to the steerer tube. The first connection member and the second connection member are both welded to two ends of the stem. The welding area includes potential risk of points of stress concentration and the welding takes a lot of time. Besides, the stem and the two connection members are made of metal which is heavy and is not welcomed for the modern bicycles.

The present invention intends to provide a handlebar stem assembly that is made of compound material and the two connection members are glued to two ends of the stem so that the assembly time and the weight are both reduced.

SUMMARY OF THE INVENTION

In accordance with one aspect of the present invention, there is provided a bicycle handlebar stem assembly which comprises a stem having a passage defined centrally and longitudinally therethrough, and two lugs extend from one of two ends of the stem. A first connection member has an aperture through which the stem extends. Two recesses are defined in an inside of the first connection member so as to receive the two lugs therein. A second connection member has a clamp part on one end thereof and an insertion extends from the other end of the second connection member. The insertion is inserted in the other end of the stem.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
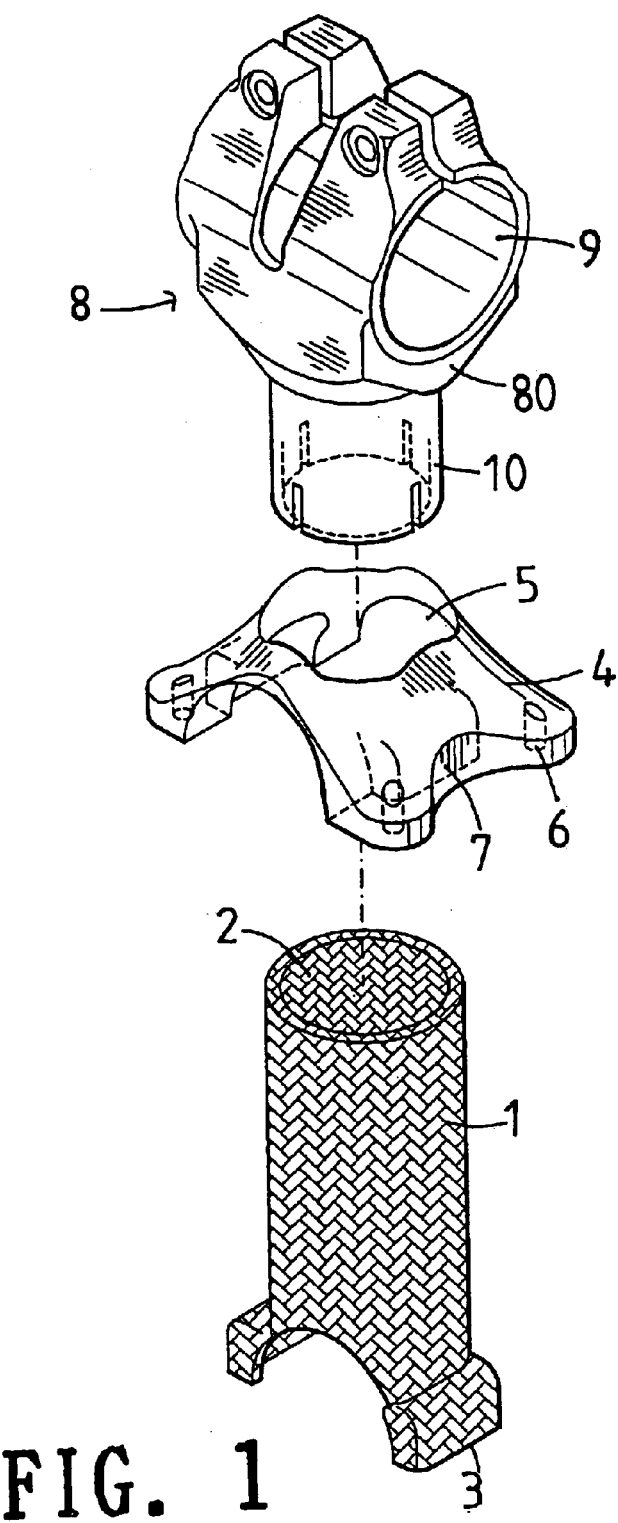
FIG. 1 is an exploded view to show the stem assembly of the present invention.
Figure 2:
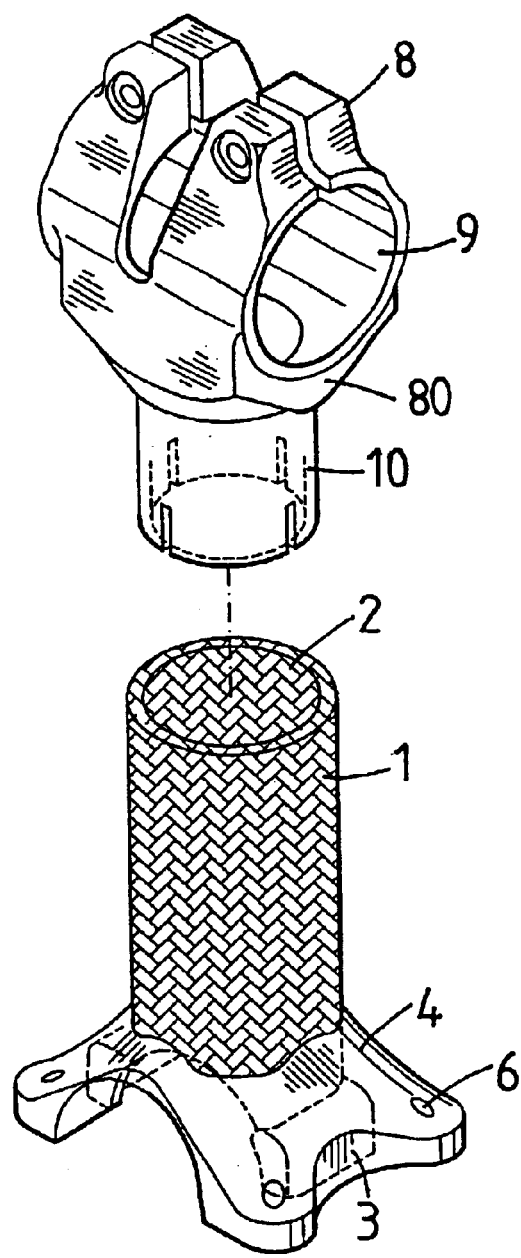
FIG. 2 is an exploded view to show that the stem and the first connection member are connected together and the second connection member is to be connected to the stem.
Figure 3:
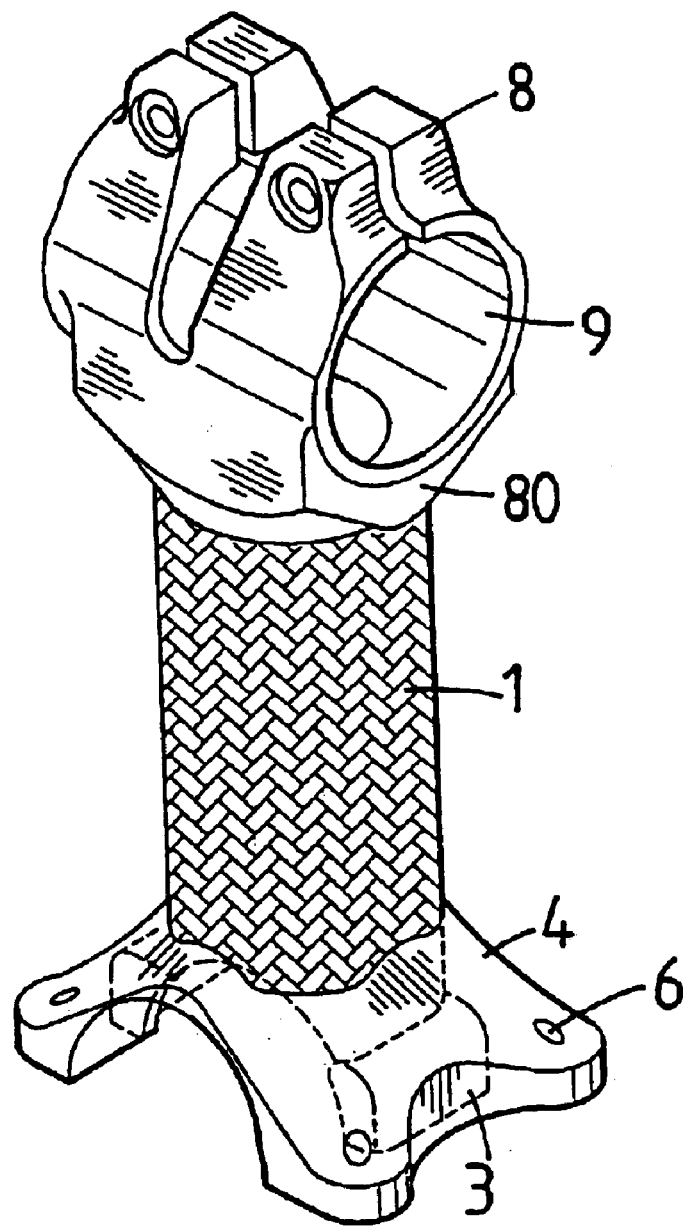
FIG. 3 is a perspective view to show the stem assembly of the present invention.
Figure 4:
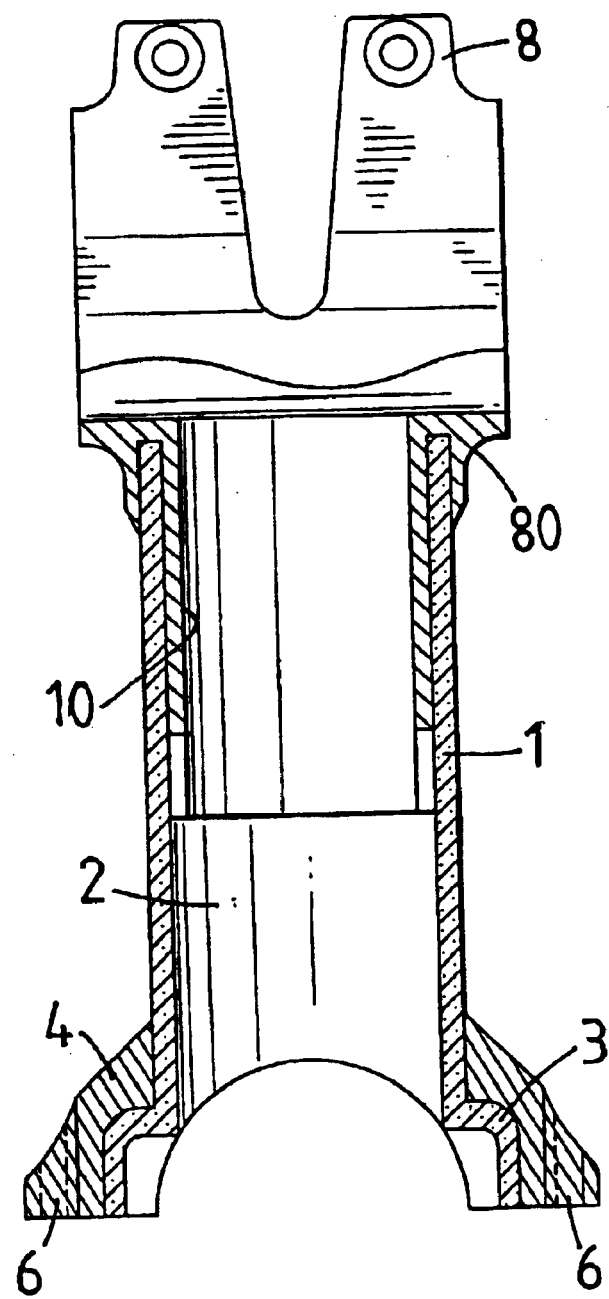
FIG. 4 is a cross sectional view to show the stem assembly of the present invention.

Referring to FIGS. 1 to 4, the stem assembly of the present invention comprises a stem 1 which is made of compound material such as carbon-fiber and has a passage 2 defined centrally and longitudinally therethrough. Two lugs 3 extend from one of two ends of the stem 1. Each lug 3 includes a head portion.

A first connection member 4 has an aperture 5 through which the stem 1 extends and adhesive is applied to glue the stem 1 with an inner periphery of the aperture 5. Two recesses 7 are defined in an inside thereof so as to receive the two head portions of the lugs 3 therein. Adhesive is also used to secure the engagement of the two recesses 7 and the two head portions of the lugs 3. Four holes 6 are defined through four corners of the first connection member 4 so that a plate (not- shown) can be connected to the first connection member 4 by bolts extending through the four holes. A steerer tube (not shown) is then secured between the first connection member 4 and the plate.

A second connection member 8 has a clamp part 9 on one end thereof so as to clamp a handlebar which is not shown, and an insertion 10 extends from the other end of the second connection member 8. The insertion 10 is inserted in the other end of the stem 1 with adhesive between an inside of the stem 1 and an outside of the insertion 10. Two extensions 80 extend from an underside of the clamp part 9 and a wall of the stem 1 is clamped between the insertion 10 and the extensions 80.

The stem assembly allows the assembly time to be reduced to a satisfied range and there is no welding process required. The whole assembly is light in weight because at least the stem 1 is made by carbon-fiber material.

Figure 5:
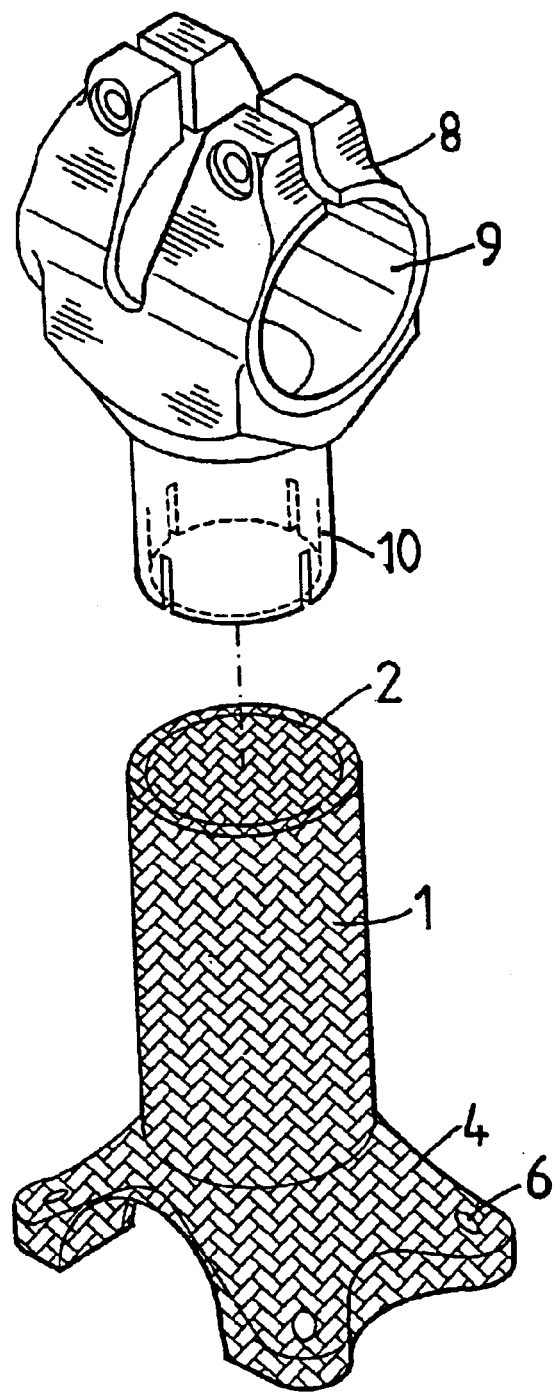
FIG. 5 is an exploded view to show that the stem and the first connection member are made as a one-piece member and the second connection member is to be connected to the stem.
Figure 6:
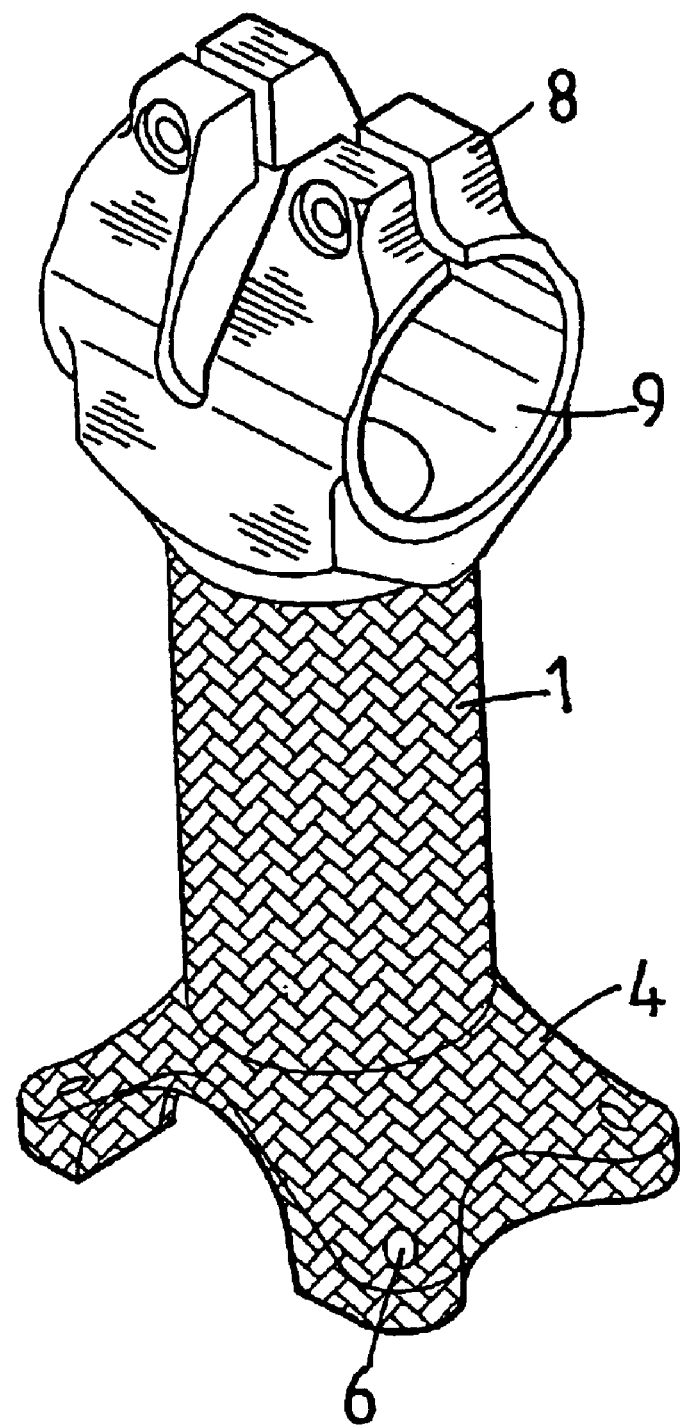
FIG. 6 is a perspective view to show the stem assembly of the present invention as shown in FIG. 5.

Referring to FIGS. 5 and 6, the first connection member 4 and the stem 1 can be made as a one-piece member, and both of which are made of carbon-fiber such that the weight of the whole assembly can be further reduced.

While we have shown and described the embodiment in accordance with the present invention, it should be clear to those skilled in the art that further embodiments may be made without departing from the scope of the present invention.

What is claimed is:

1. A bicycle handlebar stem assembly comprising:
   a stem having a passage defined centrally and longitudinally therethrough, two lugs extending from one of two ends of the stem;
   a first connection member having an aperture through which the stem extends, two recesses defined in an inside thereof so as to receive the two lugs therein, and
   a second connection member having a clamp part on one end thereof and an insertion extending from the other end of the second connection member, the insertion being inserted in the other end of the stem.

2. The stem assembly as claimed in claim 1 further comprising two extensions extending from an underside of the clamp part and a wall of the stem being clamped between the insertion and the extensions.

3. The stem assembly as claimed in claim 1, wherein the first connection member and the stem are made as a one-piece member.

4. The stem assembly as claimed in claim 1 further comprising four holes defined through four corners of the first connection member.

* * * * *